Nov. 21, 1950     L. E. EASTERDAY     2,530,864
TIP-UP FOR ICE FISHING
Filed April 16, 1948

INVENTOR.
LORIS E. EASTERDAY,
BY
McMorrow, Berman & Davidson
ATTORNEYS.

Patented Nov. 21, 1950

2,530,864

UNITED STATES PATENT OFFICE 2,530,864

TIP-UP FOR ICE FISHING

Loris E. Easterday, Fulton, Ind.

Application April 16, 1948, Serial No. 21,479

1 Claim. (Cl. 43—17)

This invention relates to ice fishing equipment and more particularly to an ice fishing apparatus having a visual signalling means to indicate when a fish is caught.

A main object of the invention is to provide a novel and improved ice fishing apparatus of the tip-up type which is very simple in construction, dependable in operation and easy to adjust for varying conditions of use.

A further object of the invention is to provide an improved ice fishing apparatus having signal means which is automatically elevated when a fish is caught, said apparatus being inexpensive to manufacture, compact in size and rugged in construction.

Further objects and advantages of the invention will become apparent from the following description and claim, and from the accompanying drawings, wherein:

Figure 1:
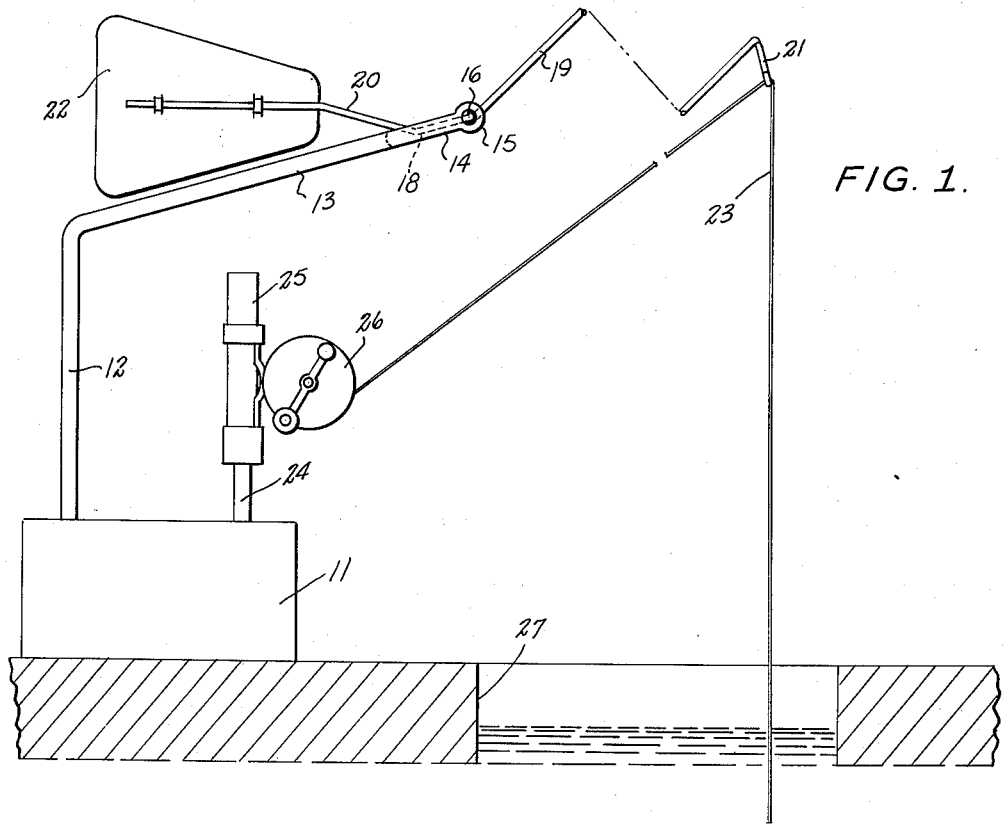
Figure 1 is a side elevational view of an ice fishing apparatus constructed in accordance with the present invention.
Figure 2:
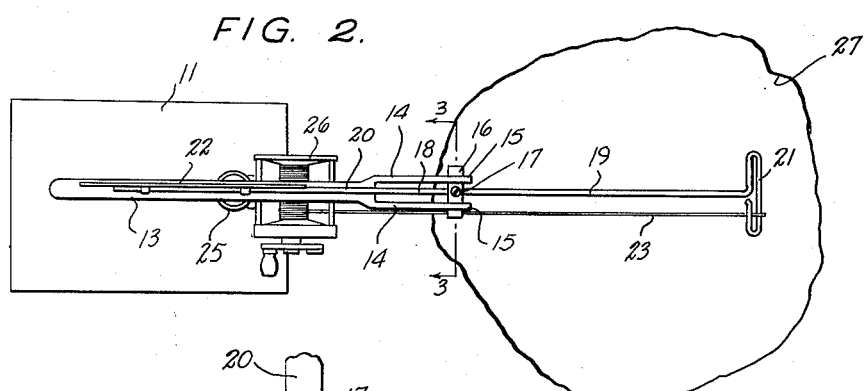
Figure 2 is a top plan view of the apparatus of Figure 1.
Figure 3:
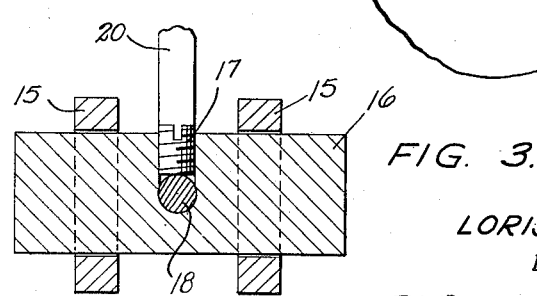
Figure 3 is an enlarged cross-sectional view taken on line 3—3 of Figure 2.

Referring to the drawings, 11 designates a weighted supporting base or block, which may, for example, be a cast iron block. Rigidly secured to block 11 and projecting upwardly therefrom is a rod member 12, bent at its intermediate portion to define a forwardly and upwardly inclined arm 13. Arm 13 is formed at its end with spaced fingers 14, 14 having respective eyes 15. Journalled in the eyes 15, 15 is a horizontal shaft 16. Extending transversely through the shaft 16 and adjustably secured thereto by a set screw 17 is a lever rod having an intermediate short straight portion 18 passing through shaft 16 and angled arm portions 19 and 20. The forwardly extending arm portion 19 is formed at its end with a depending elongated transverse rigid loop 21. The rearwardly extending arm portion 20 has secured thereto a vertical sheet metal flag 22. The weight of flag 22 normally overbalances the weight of the loop 21 and the fishing line 23 which is passed through the loop, as shown in Figures 1 and 2. The flag 22 is in the same vertical plane as arm 13 so that the portion of arm 13 intermediate the fingers 14, 14 acts as a stop to limit downward swinging movement of the flag.

Projecting upwardly from block 11 forwardly of rod member 12 is a vertical rod 24 carrying a vertical tubular extension 25. Clamped to extension 25 is a conventional fishing reel 26 on which the fishing line 23 is wound.

In operation, the weighted block 11 is positioned a short distance rearwardly of the hole in the ice shown at 27, through which the fishing line 23 extends. Normally, when there is no fish on the hook, flag 22 will be in its depressed position, as shown in Figure 1. When a fish is caught, line 23 is placed in tension and arm 19 is swung downwardly by the force exerted thereon at loop 21 by line 23. This swings arm 20 upwardly, elevating flag 22 and providing a visual indication that a fish is engaged on the hook. The operator, being thus notified may then manipulate reel 26 to draw in the fish.

The sensitivity of the apparatus may be regulated by varying the point on intermediate lever portion 18 at which said intermediate lever portion is clamped by set screw 17 to the pivot shaft 16.

While a specific embodiment of a fishing tip-up device has been disclosed in the foregoing description, it will be understood that various modifications within the spirit of the invention may occur to those skilled in the art. Therefore it is intended that no limitations be placed on the invention except as defined by the scope of the appended claim.

What is claimed is:

An ice fishing apparatus comprising a weighted base, a rod member secured to said base and projecting upwardly therefrom, said rod member having a bend therein intermediate its ends which extends forwardly and upwardly, a lever having a short straight intermediate portion and angled forwardly and rearwardly extending arm portions, a transverse shaft element rotatably carried at the end of said rod member, means adjustably securing said short intermediate portion of the lever to said shaft element, the forwardly extending arm portion of said lever being formed with a depending elongated transverse loop and the rearwardly extending arm portion having secured thereto a vertical flag element overlying the upper portion of the rod member, a vertical support element rising from said base forwardly of the rod member, a reel secured to said vertical support element, and a fishing line wound on said reel and passing through the loop, whereby a downward pull on the fishing line will rotate said lever to cause the flag element to be elevated.

LORIS E. EASTERDAY.

REFERENCES CITED

The following references are of record in the file of this patent:

UNITED STATES PATENTS

| Number | Name | Date |
|---|---|---|
| 374,737 | Geils | Dec. 13, 1887 |
| 962,309 | Butler | June 21, 1910 |
| 962,420 | Dibbles | June 28, 1910 |
| 1,275,014 | Gampert | Aug. 6, 1918 |
| 2,136,864 | Paquette | Nov. 15, 1938 |
| 2,137,771 | Goodwin | Nov. 22, 1938 |
| 2,481,881 | Schneider | Sept. 13, 1949 |